Aug. 15, 1950   D. H. ANNIN   2,518,852
REGULATING DEVICE
Filed March 19, 1945
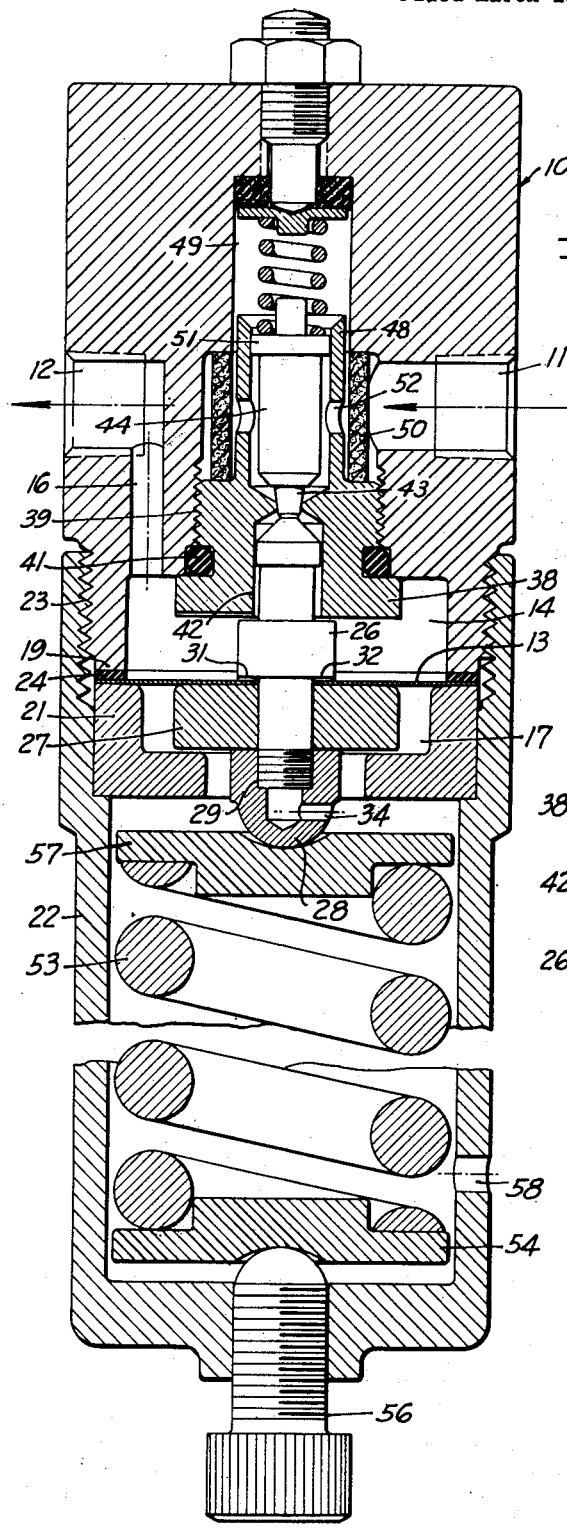
FIG_1_
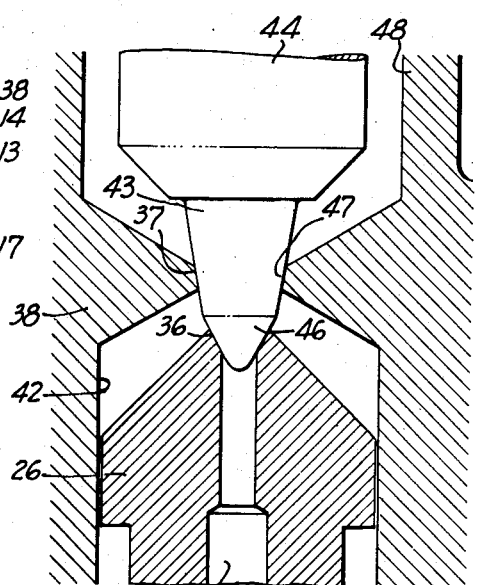
FIG_2_
INVENTOR.
D. H. Annin.
BY
Paul D. Flehr
ATTORNEY Patented Aug. 15, 1950

2,518,852

UNITED STATES PATENT OFFICE 2,518,852

REGULATING DEVICE

Douglas H. Annin, Oakland, Calif., assignor to Fluid Control Engineering Co., Piedmont, Calif., a copartnership Application March 19, 1945, Serial No. 583,501

1 Claim. (Cl. 50—23)

This invention relates generally to regulating devices capable of automatically controlling the flow of fluids, and particularly devices capable of maintaining a desired gas pressure in a closed or substantially closed pressure system.

In the operation of various fluid flow control equipment, such as fluid pressure regulators and pressure relief valves, it is frequently desirable to provide a loading pressure with provision for adjusting the same over a wide range of pressures. For example one may desire to supply a loading pressure from an external source to the pressure chamber of a regulator such as shown in Grove Patent No. 2,047,101. A device suitable for this purpose should be capable of supplying gas at a selected pressure over a relatively wide pressure range, and should have means for venting gas when the pressure in the system rises beyond a desired value, due for example to an increase in temperature. A loading regulator of this type is disclosed in Grove et al. Patent 2,342,659. However the device in that instance is comparatively expensive to manufacture in quantities, due to the relatively large number of parts in the completed assembly, and great care must be taken in manufacture and assembly in order to have the ball type valves employed relatively gas tight.

It is an object of the present invention to provide a regulator device of the above type which is simple in construction, and which can be readily manufactured on a production basis.

Another object of the invention is to provide a regulator of the above character having valve means which will remain relatively gas tight, and which affords relatively sensitive response.

Additional objects of the invention will appear from the following description in which the preferred embodiment has been set forth in detail in conjunction with the accompanying drawing.

Referring to the drawing:

Figure 1 is a side elevational view in cross-section showing a regulating device incorporating the invention.

Figure 2 is an enlarged cross-sectional detail showing the valve and seat elements.

The device as illustrated in the drawing consists of a body 10 provided with the inlet and outlet passages 11 and 12, which can be threaded or otherwise formed for making connections with associated piping. Normally passage 11 is connected with a source of high pressure gas, while passage 12 is connected to a low pressure system which is to be maintained at a selected pressure. A flexible operating diaphragm 13 is carried by the body and can be formed of suitable material such as relatively thin flexible sheet metal. The chamber 14 on one side of this diaphragm is in communication with the outlet passage 12 through duct 16. Space 17 on the other side of the diaphragm is in communication with the atmosphere.

The peripheral margin of diaphragm 13 is clamped upon the annular body area 19, by the clamping ring 21. This ring in turn is held in clamping position by the casing 22, which has a threaded engagement 23 with the body. A suitable gasket 24 can be provided to seal the diaphragm with respect to the body. Assembled together with the diaphragm 13 are the stem-like member 26, the diaphragm plate 27, and the retaining cap 28. Member 26 extends through the center of the diaphragm and the plate 27, and has a threaded connection 29 with the cap 28. A suitable gasket 31 is interposed between the diaphragm and a shoulder area 32 on member 26, in order to prevent leakage.

Member 26 has an axial duct 33 which at one end communicates with the atmosphere through the duct 34 in cap 28. At the other end of duct 33 the member 26 is formed to provide the conical valve seat 36. As will be presently explained valve seat 36 in conjunction with a valve member serves to control venting of gas to the atmosphere in the event the pressure upon the outlet side increases beyond a desired value.

In addition to the seat 36 and located relatively close to the same, there is another valve seat 37 on a member 38. Member 38 can be in the form of a body plug having a threaded connection 39, and with suitable sealing means such as an O ring to seal the same against leakage. As shown in Figure 2 seat 36 is on the outflow side of seat 37, and as shown there in exaggerated form the adjacent enlarged portion of member 26 is loosely fitted within bore 42 formed in member 38 in such a way as to generally align the same while at the same time permitting limited self aligning action.

Cooperating with both the seats 36 and 37, there is a needle-like valve member 43 which is carried upon one end of a valve carrying member 44. Member 43 is provided with a valve surface 46 for engaging seat 36 and a surface 47 for engaging seat 37. Surfaces 46 and 47 are relatively close to each other, but are displaced axially along the length of the valve member 43. Surface 47 can be at a relative steep angle such as 10° and surface 46 at a suitable angle such as 30°. Member 38 also serves to carry a guide sleeve 48, which generally embraces the valve carrying member 44 and which in turn is accommodated within a bore 49 formed in the body. That end of the valve carrying member 44 which is remote from the valve member 43 is provided with an enlargement 51 for slidable guiding engagement with the sleeve 49. Thus the other end of the valve carrying member 44, and the needle-like valve member 43, are permitted freedom of movement in a lateral direction whereby they are self-aligning with respect to either one of the two seats 36 and 37.

The inlet or high pressure side of seat 37 is in communication with the passage 11 through openings 52. A suitable screen or filter 53 can be positioned within the body about sleeve 48 and the openings 52.

The casing 22 is of suitable size to enclose the loading spring 53. One end of this spring is seated upon disc 54, which is carried upon the inner end of the adjustable screw 56. The other end of the spring is seated upon disc 57, which in turn is seated upon the cap 28. The casing is vented to the atmosphere through port 58.

To explain operation of the device described above it is presumed that inlet passage 11 is connected to a source of gas under pressure, while outlet 12 is connected to a low pressure system such as the loading dome of a regulator of the type disclosed in said Patent No. 2,047,101. The pressure upon the outlet side is determined by the tension of spring 53. Assuming that there is some loss or consumption of gas on the outlet side resulting in a slight drop in pressure, the pressure is thereby reduced in chamber 14 and as a result diaphragm 13 flexes a slight amount under the force of spring 53, to open the needle-like valve member 43 with respect to seat 37. This admits air from the inlet side through bore 42, to build up the outlet pressure. When the pressure has been built up to the original level diaphragm 13 is restored to its initial position and as a result valve member 43 closes upon seat 37.

During the operations just described valve member 43 has remained closed with respect to seat 36. Should the pressure upon the outlet side build up above the desired value, due for example to an increase in temperature on the outlet side, diaphragm 13 is flexed a slight amount against spring 53, and as a result seat 36 is opened with respect to the valve surface 46. This permits gas from the outlet side (from chamber 14) to vent to the atmosphere through ducts 33 and 34. When the pressure has been restored by such venting, diaphragm 13 returns to its initial position whereby seat 36 again closes upon the valve surface 46.

The simplicity of construction and the ease of manufacture and assembly will be apparent from the above. The construction is such that there is self-aligning action between the valve and seating surfaces. Thus valve member 43 is free to align itself laterally to effect gas-tight engagement with the seat 37. Seat 36 is also capable of aligning itself both with respect to seat 37, and with respect to the valve member 43. This is because member 26 is of substantial length and its upper end as viewed in Figure 1 is fitted to be free to move laterally a sufficient amount to insure proper alignment with the valve member 43. Valve member 43 remains at all times within and extending through seats 47 and 36, and its movement is insufficient to at any time permit substantial departure from proper alignment of the parts.

I claim:

In pressure regulating apparatus, a body having inlet and outlet passages, a flexible diaphragm carried by the body, the body providing a fluid chamber on one side of the diaphragm in communication with the outlet side of the regulator, a stationary valve seat carried by the body, a conical shaped orifice through said seat which when open serves to permit flow between the inlet and outlet passages, a needle-like valve member disposed within said valve seat and movable in opposite directions between open and closed positions, said member having one conical shaped surface for engagement with and for guiding the same within the seat and a second conical shaped surface on its free end and located on the outlet side of said seat, that portion of the needle having said one conical surface being of such length that when closed upon the seat it extends for a substantial distance from the outlet side of the seat, an elongated valve carrying member having said valve member mounted upon one end of the same and providing its sole mounting means, means serving to guide the other end of said valve carrying member whereby said valve member is permitted self-aligning action in a direction laterally of said stationary seat, spring means serving to urge said valve carrying member in a direction to close the valve member upon said seat, an elongated stem carried by the diaphragm and extending to a region adjacent to and on the outlet side of the stationary seat, a second valve seat carried by the end of said stem and disposed to cooperate with the end of said needle-like member, the stem having a vent duct leading from the second seat to the atmosphere, and means for applying loading force to the diaphragm in a direction tending to flex the same toward said chamber and thereby urge the second seat toward closed position with respect to the needle-like valve member, the other side of the diaphragm being exposed to atmospheric pressure.

DOUGLAS H. ANNIN.

REFERENCES CITED

The following references are of record in the file of this patent:

UNITED STATES PATENTS

| Number | Name | Date |
| --- | --- | --- |
| 2,013,222 | Thomas | Sept. 3, 1935 |
| 2,089,144 | Work | Aug. 3, 1937 |
| 2,141,705 | Beyrodt | Dec. 27, 1938 |
| 2,357,318 | Donaldson | Sept. 5, 1944 |